United States Patent
Tsuchiya et al.

(10) Patent No.: US 8,119,300 B2
(45) Date of Patent: Feb. 21, 2012

(54) AIR CONDITIONING CONTROL SYSTEM

(75) Inventors: Naohisa Tsuchiya, Toyota (JP);
Tomotaka Ishikawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 92 days.

(21) Appl. No.: 12/298,984

(22) PCT Filed: Sep. 13, 2007

(86) PCT No.: PCT/JP2007/068325
§ 371 (c)(1),
(2), (4) Date: Oct. 29, 2008

(87) PCT Pub. No.: WO2008/044446
PCT Pub. Date: Apr. 17, 2008

(65) Prior Publication Data
US 2009/0130513 A1    May 21, 2009

(30) Foreign Application Priority Data

Oct. 10, 2006    (JP) .................................. 2006-276841

(51) Int. Cl.
*H01M 8/04* (2006.01)
(52) U.S. Cl. ........................ 429/434; 429/428
(58) Field of Classification Search .................. 429/26, 429/434
See application file for complete search history.

(56) References Cited

U.S. PATENT DOCUMENTS

| | | | | |
|---|---|---|---|---|
| 5,547,125 A | * | 8/1996 | Hennessee et al. | 236/49.3 |
| 2005/0097917 A1 | * | 5/2005 | Hanada | 62/434 |
| 2005/0178523 A1 | * | 8/2005 | Itoh et al. | 165/42 |
| 2007/0298298 A1 | * | 12/2007 | Ishigaki et al. | 429/24 |

FOREIGN PATENT DOCUMENTS

| | | |
|---|---|---|
| JP | 2002-98430 A | 4/2002 |
| JP | 2002-127734 A | 5/2002 |
| JP | 2005-263200 A | 9/2005 |
| JP | 2006-286525 A | 10/2006 |
| WO | WO 2006/064955 A1 | 6/2006 |
| WO | WO 2006064955 A1 * | 6/2006 |

OTHER PUBLICATIONS

Office Action issued Oct. 18, 2011 in Japanese Patent Application No. 2006-276841 and partial English translation thereof.

* cited by examiner

*Primary Examiner* — Patrick Joseph Ryan
*Assistant Examiner* — Brent Thomas
(74) *Attorney, Agent, or Firm* — Kenyon & Kenyon LLP

(57) ABSTRACT

An air conditioning control system having a cooling device for cooling a fuel cell by circulating a liquid coolant through the fuel cell using a main circulation pump while also providing an air conditioning control device for controlling air conditioning in a vehicle interior, wherein heat exchange between the cooling device and the air conditioning control device is possible. When the fuel cell is operated intermittently in the air conditioning control system, the main circulation pump is continuously operated.

3 Claims, 2 Drawing Sheets

AIR CONDITIONING CONTROL SYSTEM

This is a 371 national phase application of PCT/JP2007/068325 filed 13 Sep. 2007, claiming priority to Japanese Patent Application No. JP 2006-276841 filed 10 Oct. 2006, the contents of which are incorporated herein by reference.

BACKGROUND OF INVENTION

1. Field of the Invention

The present invention relates to an air conditioning control system which utilizes a fuel cell.

2. Description of the Related Art

At low temperatures, fuel cells do not generate sufficient power. To attempt to address this problem, there is a technique in which fuel cells are warmed by using the electric power of the fuel cell to heat a liquid coolant when the fuel cell is at a low temperature, such as when activating the fuel cell. To maintain the fuel cell at a specific temperature appropriate for operation, a fuel cell system also includes a cooling device for circulating the coolant to dissipate undesired heat generated in the fuel cell by a radiator.

On the other hand, moving objects which utilize the fuel cell as a power source (e.g., hybrid or electric vehicles or the like) include an air conditioning control device for heating and cooling the passenger compartment or interior of the vehicle. An example of such an air conditioning device would be a vapor compression heat pump which transfers heat from the lower temperature side to the higher temperature side.

Other techniques have also been proposed for utilizing or dissipating heat generated in the fuel cell system in the air conditioning device. For example, in one technique, heat generated in a fuel cell stack is collected by a heat exchanger for heating, and the collected heat is utilized as a heat source for a heater. In the air conditioning device for vehicles, where the vehicle interior can be heated by running the cooling liquid of the fuel cell through a heater core, when the unnecessary heat generated in the fuel cell is insufficient for the required amount of heat necessary for air conditioning, another technique may be used to control the generation of heat to compensate for the shortage of heat. In a still another technique, an extra heat drained from the fuel cell itself may be dissipated into the air by a radiator disposed in the air conditioning system. Further, there is a system for heating the cooling fluid of the fuel cell by an extra power generated in regenerative braking, where the extra power is consumed while utilizing the heat of the cooling liquid of the fuel cell for air conditioning.

SUMMARY OF THE INVENTION

In a system wherein the cooling device of the fuel cell is combined with the air conditioning device, the fuel cell may be operated intermittently when the output of the fuel cell is insufficient to provide the required output. In such a case, the ambient temperature surrounding the air compressor of the air conditioning device increases, which could lead to malfunctioning of the air conditioning device. To maintain the ambient temperature of the air compressor at a low temperature, a large circulation pump must be provided to circulate the cooling liquid used in the cooling device of the fuel cell.

The present invention includes an air conditioning control system having a cooling device for cooling a fuel cell by circulating a cooling liquid through the fuel cell using a main circulation pump and also having an air conditioning control device for controlling air conditioning in a vehicle interior, wherein exchange of heat between the cooling device and the air conditioning control device is possible. The main circulation pump is continuously operated when the fuel cell is operated intermittently in the air conditioning control system.

DETAILED DESCRIPTION OF EXAMPLE EMBODIMENTS

A preferred embodiment of the present invention will be described below with reference to the attached drawings.

Figure 1:
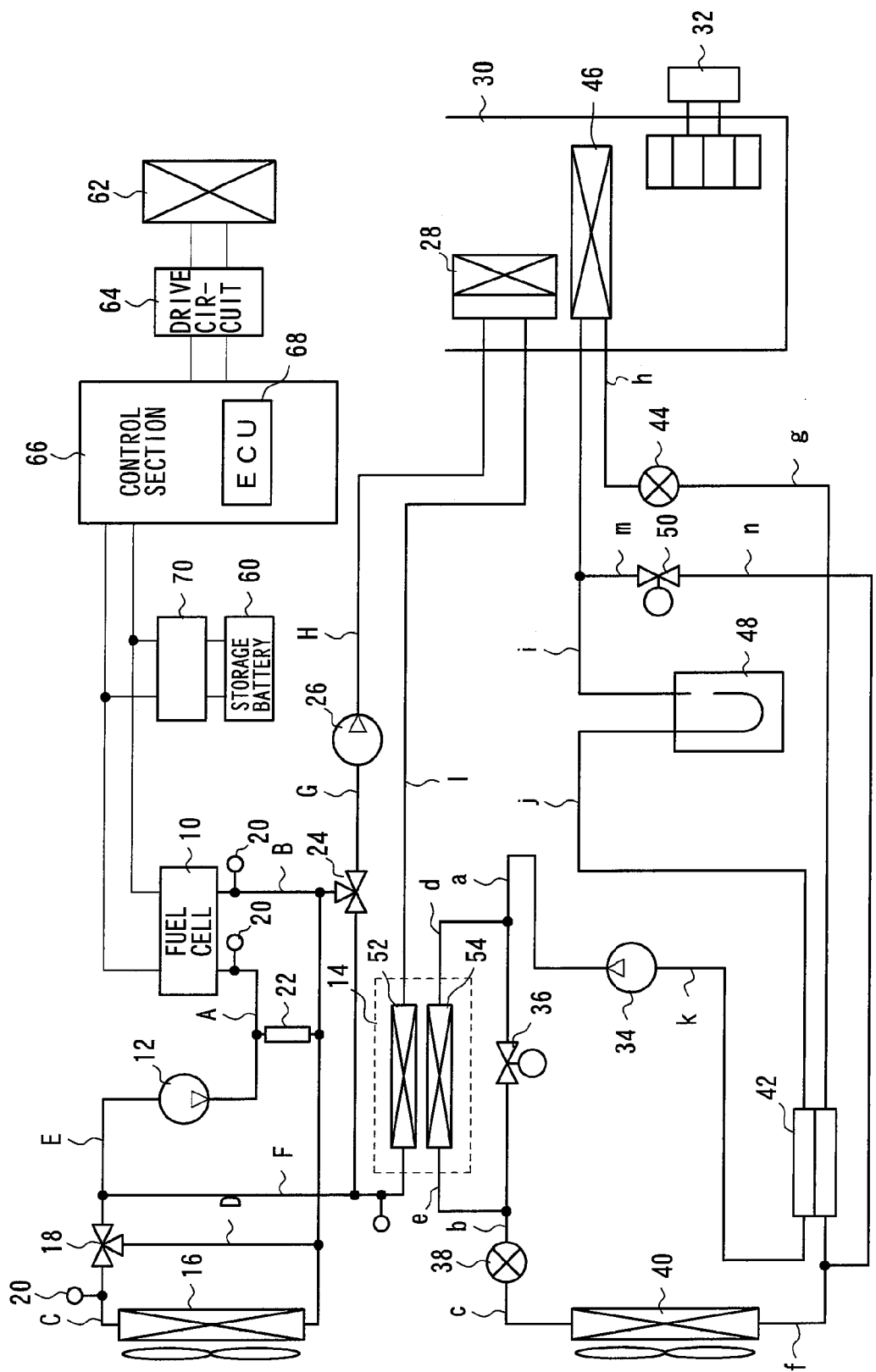
FIG. 1 shows an arrangement of an air conditioning control system according to an embodiment of the present invention.

FIG. 1 is a block diagram showing an arrangement of an air conditioning control system according to the present invention. The air conditioning control system includes a fuel cell system and an air conditioning control device. The fuel cell system and the air conditioning control device shown in FIG. 1 are mounted on a vehicle. The fuel cell system generates electric power used to drive the vehicle. The air conditioning control device regulates the temperature in the interior (passenger compartment, etc.) of the vehicle.

(Fuel Cell System)

The fuel cell system includes a fuel cell 10 and a cooling device for fuel cell 10.

Fuel cell 10 is formed by stacking a plurality of single cells, each cell being a power generating unit. Each cell includes an electrolyte, a fuel electrode (anode) and an air electrode (cathode), where two electrodes sandwiching the electrolyte, and two separators each on the fuel electrode side and the fuel electrode side.

The fuel electrode has a diffusing layer and a catalytic layer. A fuel gas, such as hydrogen gas, is supplied to the fuel electrode from a fuel supply device (not shown). The fuel gas supplied to the fuel electrode is then diffused in the diffusing layer and reaches the catalytic layer. In the catalytic layer, an oxidization reaction occurs and the hydrogen is separated into protons (i.e., hydrogen ions) and electrons. The hydrogen ions pass through the electrolyte to reach the air electrode, while the electrons flow through an external circuit to reach the air electrode.

The air electrode has a diffusing layer and a catalytic layer. An oxidizer gas, such as an air, is supplied to the air electrode from an oxidizer supplying device (not shown). The oxidizer gas supplied to the air electrode is then diffused in the diffusing layer and reaches the catalytic layer. In the catalytic layer, a reducing reaction occurs with the oxidizer gas, the hydrogen ions reached to the air electrode through the electrolyte, and the electrons reached to the air electrode from the external circuit. Water is obtained as a product of this reaction.

During the oxidizing reaction at the fuel electrode and the reducing reaction at the air electrode, the electrons flowing through the external circuit are transmitted as electric power corresponding to a load connected between both terminals of the cell stack in the fuel cell 10.

The fuel cell 10 generates heat as it generates electricity. Therefore, as there is a specific temperature appropriate for the electric chemical reaction in fuel cell 10, a cooling device is also provided in fuel cell 10 so that it can be operated at a suitable temperature. Typically, the cooling device adopts a cooling method involving circulating a liquid coolant through a coolant channel formed in fuel cell 10.

In this embodiment, the cooling device is formed in the following manner. The fuel cell 10 has an inlet and an outlet for coolant traveling from and to a cooling liquid channel of fuel cell 10. The coolant inlet is connected via a tube A with the outlet of a circulation pump (water pump) 12 which circulates the coolant. On the other hand, the outlet of the cooling fluid from fuel cell 10 is connected via a tube B to the inlet of a radiator (or a cooler) 16 which cools the coolant.

In addition, the outlet of the coolant of the radiator 16 is connected to a second inlet of a three-way valve 18 via a tube C. One end of a bypass tube D is coupled with tube B, the bypass tube D branching off tube B. The other end of bypass tube D is connected to a first inlet of three-way valve 18. The outlet of three-way valve 18 is connected to the inlet of circulation pump 12 via a tube E.

Thus, the cooling device includes a first circulation path to circulate the coolant via the radiator 16, and a second circulation path to circulate the coolant via bypass tube D without passing through radiator 16 (i.e., bypassing the cooler). The amount of the coolant flowing through the first and the second circulation routes, respectively, is regulated by three-way valve 18 depending on the temperature of fuel cell 10.

Specifically, a temperature sensor 20 is provided each on tube A, B, and C to detect the temperature of the coolant drained from fuel cell 10, so that the operation of three-way valve 18 is controlled according to the temperature detected by these sensors 20.

For example, if the temperature of the coolant at the first and second inlets of three-way valve 18 is lower than a first temperature, the first temperature being a threshold value used to determine whether or not fuel cell 10 should be heated, the first inlet of three-way valve 18 is opened while closing the second inlet thereof so as to suspend further cooling of the coolant by radiator 16. On the other hand, if the temperature of the coolant exceeds an upper limit, up to which it is assumed that the fuel cell is operating normally, the first inlet of three-way valve 18 is closed while the second inlet thereof is opened so that the radiator 16 will cool the coolant.

An ion exchanger 22 is also provided across the inlet and outlet of the coolant of fuel cell 10. Ion exchanger 22 refines the coolant by removing impurities contained in the coolant circulating through the cooling device of the fuel cell. As a result, the dielectric strength voltage of the coolant can be increased.

The cooling device also includes a tubing system which makes it possible to combine the cooling device with the air conditioning device. Specifically, a first inlet of a three-way valve 24 is connected with tube B, while a second inlet thereof is connected with tube E via tube F and is also connected to an outlet of the coolant of a heat exchanger 14 with heating element. An outlet of three-way valve 24 is connected to an inlet of a circulation pump 26 via a tube G. An outlet of circulation pump 26 is connected to an inlet of a heat transfer element in a first interior heat exchanger (or an interior gas cooler GC) 28 via a tube H. An outlet of the heat transfer element of the first interior heat exchanger 28 is connected to an inlet of heat exchanger with heating element via a tube I. A first interior heat exchanger 28 is placed on an air channel 30 of the air fed into the interior and exchanges heat between the coolant from circulation pump 26 and the air fed into the interior by a fan 32.

(Air Conditioning Device)

The interior air conditioning device is formed in the following manner. An outlet of a motorized compressor 34 for suctioning and compressing a refrigerant 34 is connected to an inlet of a cooling solenoid valve 36 via a tube a. An outlet of cooling solenoid valve 36 is connected to an inlet of a heating expansion valve 38 via a tube b. An outlet of heating expansion valve 38 is connected to an inlet of an exterior heat exchanger 40 via a tube c.

Tube a is connected with a tube d in a branching manner, and tube d is connected to a refrigerant inlet of heat exchanger 14 with heating element. A refrigerant outlet of heat exchanger 14 with heating element is connected to the middle of tube b via a tube e. As such, two parallel refrigerant flow paths are provided between motorized compressor 34 and exterior heat exchanger 40. In response to the opening/closing operations of cooling solenoid valve 36, the amount of refrigerant flowing through these two paths can be regulated.

An outlet of an exterior heat exchanger 40 is connected via a tube f to a refrigerant inlet formed on the exterior side of an interior heat exchanger 42. Interior heat exchanger 42 exchanges heat between the refrigerant from exterior exchanger 40 and the refrigerant suctioned by motorized compressor 34. A refrigerant outlet formed on the exterior side of interior heat exchanger 42 is connected to an inlet of cooling expansion valve 44 via a tube g. An outlet of the cooling expansion valve 44 is connected to an inlet of a second interior heat exchanger (evaporator) 46 via a tube h.

A second interior heat exchanger 46 is disposed in the air flow channel 30 upstream of the first interior heat exchanger 28, and exchanges heat between the air to be fed into the interior and the refrigerant. An outlet of the second interior heat exchanger 46 is connected to an inlet of an accumulator (or gas-liquid separator) 48 via a tube i. The accumulator 48 separates the refrigerant circulating through the refrigerant channel (or heat pump) into a gas phase refrigerant and a liquid phase refrigerant, and drains the latter. An outlet of accumulator 48 is connected to a refrigerant inlet on the interior side of interior heat exchanger 42 via a tube j, and a refrigerant outlet on the interior side of interior heat exchanger 42 is connected to an inlet of motorized compressor 34 via a tube k.

One end of a bypass tube m is connected to the middle of tube i, and the other end of it is connected to a heating solenoid valve 50. An outlet of heating solenoid valve 50 is connected to the refrigerant inlet on the exterior side of interior heat exchanger 42 via a bypass tube n.

A fan 32 is disposed in the air flow channel 30 to guide the air introduced from the interior and exterior of the vehicle to the downstream direction. An air mixing door (not shown) is attached to first interior heat exchanger 28 to regulate the amount of air passing through it. The air mixing door is designed to increase the amount of air passing through first interior heat exchanger 28 as the door opens wider.

The heat exchanger 14 with a heating element includes the heating element (not shown) having a heater for generating heat by the electric current, a coolant side 52 including a flow channel of the coolant, and a refrigerant side 54 including a flow channel of the refrigerant. Both the coolant and the refrigerant flowing through the respective channels are heated as the heating element generates heat. Heat exchange also occurs between the coolant and the refrigerant flowing through the respective flow channels.

(Control Element)

A control mechanism of the above-mentioned fuel cell system and the air conditioning control device will next be described. As shown in FIG. 1, a vehicle according to the present embodiment of the present invention includes fuel cell 10, storage battery 60 connected in parallel with fuel cell 10, a motor 62 for supplying a driving force for the vehicle, a drive circuit of motor 64, and a control element 66 for controlling the operation of motor 62 by supplying the electric power from one or both of the fuel cell 10 or storage battery 60 to the drive circuit 64.

Motor 62 may be temporarily used as a generator when the vehicle is decelerated (e.g., when the brakes of the vehicle are activated). When this is done, the regenerative braking is applied. A regenerative energy (or regenerative electricity) created by the regenerative braking will be collected in storage battery 60, and extra power which cannot be stored in the storage battery 60 will be dissipated by way of generating heat by the heating element.

Control element 66 is disposed between fuel cell 10/storage battery 60 and drive circuit 64. Control element 66 is connected via a power supplying line to individual heat generating elements (not shown) of heat exchanger 14 with heating element. Control element 66 includes various components, such as an inverter (not shown) for converting a DC current from fuel cell 10 and/or storage battery 60 into an AC current, and a control device (ECU (Electric Control Unit)) 68 for controlling the fuel cell system and the air conditioning control device in response to signals received from various elements thereof.

A residual capacity sensor 70 of storage battery is connected to the terminals of storage battery 60. Residual capacity sensor 70 measures the voltage and current values of the storage battery and transmits the charge level of storage battery 60 to control element 66. Control element 66 is designed to watch the charge level of storage battery 60. When electric power is generated by the regenerative braking and the charge level does not exceed a predetermined value, control element 66 charges storage battery 60 by supplying the electric power (electric current) generated by the regenerative braking from drive circuit 64 to the side of storage battery 60. However, when the charge level exceeds the predetermined value, control element 66 directs the electric power (electric current) to the side of heating element of heat exchanger 14, so as to generate heat by the heating element.

The ECU 68 includes a CPU (Central Processing Unit), a memory, an I/O interface, and so on, and executes a predetermined control program stored in the memory for the on-off control of heat generation in the heating element. In association with the on/off control, the ECU 68 also manages other tasks regarding the temperature control of fuel cell 10, the interior heating operation, and the consumption of the excessive regenerative energy. In addition, the ECU 68 controls the opening and closing operations or regulates the opening angle of valves including three-way valves 18, 24; cooling solenoid valve 36; heating expansion valve 38; cooling expansion valve 44; and heating solenoid valve 50. Further, the ECU 68 regulates the rotation rate of fans of radiator 16 and exterior heat exchanger 40, and also regulates the wind flow of fan 32.

(Operation)

Figure 2:
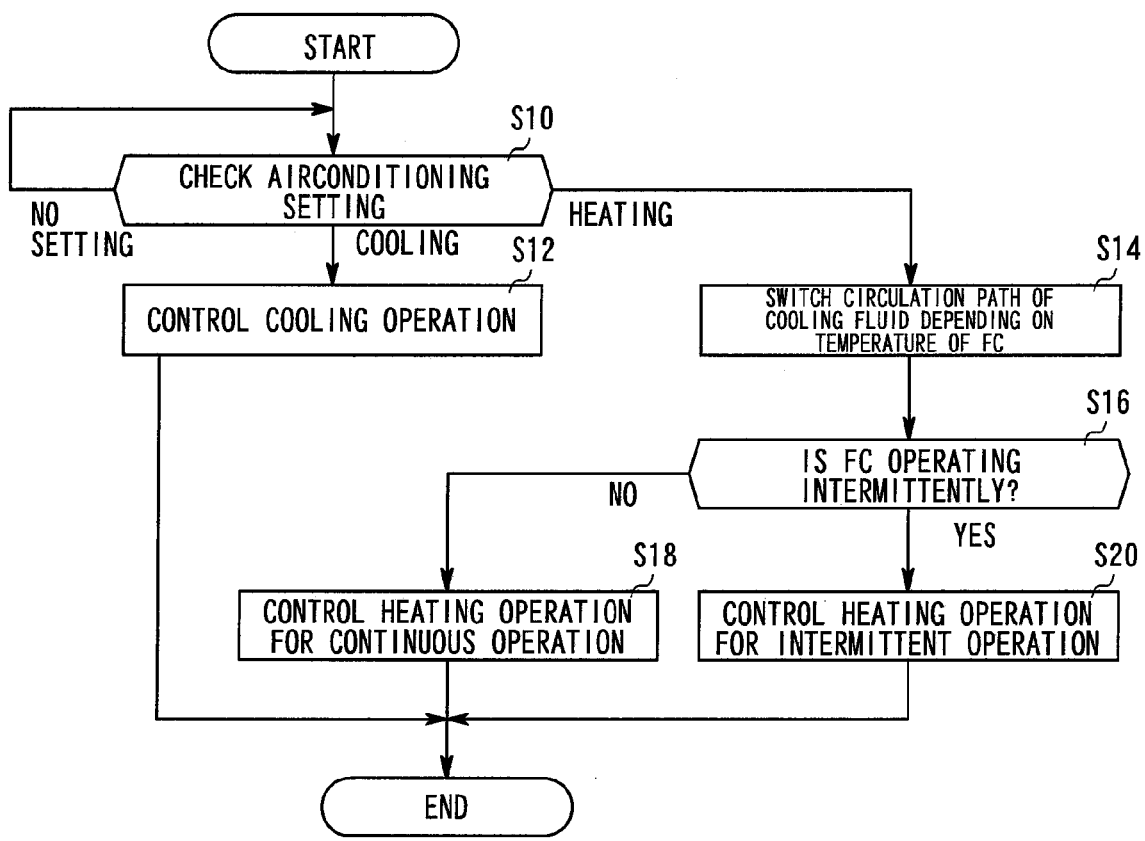
FIG. 2 is a flowchart of an air conditioning control method according to an embodiment of the present invention.

The air conditioning control system including the cooling device and the air conditioning control device of the fuel cell may employ the heat generated by the fuel cell for heating the interior of the vehicle. In the following, the heating and cooling controls of the air conditioning control system according to the embodiment of the present invention will be described. The air conditioning control system is controlled in accordance with a flow chart shown in FIG. 2.

In step S10, cooling or heating is selected. In response to a signal generated by manipulating an air conditioning control panel installed in the vehicle cabin, control element 66 determines whether or not the cooling or heating operation is needed. As a result, the process continues on to step S12 if the cooling operation is to be carried out. If the heating operation is selected, the process continues to step S14.

In step 12, the air conditioning control system executes the cooling operation. The ECU 68 of control section 66 opens cooling solenoid valve 36 and closes heating solenoid valve 50. The ECU 68 also activates cooling expansion valve 44 and deactivates heating expansion valve 38. As a result, the refrigerant reaches exterior heat exchanger 40 from motorized compressor 34 without passing through heat exchanger 14 with heating element, nor being affected by heating expansion valve 38. Further, the refrigerant from exterior heat exchanger 40 is fed to the second interior heat exchanger 46 through cooling expansion valve 44.

In this state, motorized compressor 34 compresses the refrigerant and sends it out to tube a. The refrigerant then cycles through cooling solenoid valve 36, heating expansion valve 38, exterior heat exchanger 40, interior heat exchanger 42, cooling expansion valve 44, second interior heat exchanger 46, accumulator 48, and interior heat exchanger 42, to return to the motorized compressor 34.

The ECU 68 also closes the air mixing door provided in channel 30, so that the air flowing through channel 30 is guided into the vehicle cabin without passing through first interior heat exchanger 28.

Further, the ECU 68 sends the control signal to three-way valve 24 to switch it so that tube F is connected with tube G and tube B is disconnected from tube G. As a result, the coolant circulating system of the cooling device of the fuel cell is separated from the refrigerant circulating system of the air conditioning control device.

In this state, exterior heat exchanger 40 dissipates heat by exchanging heat between the external air and the refrigerant. Second interior heat exchanger 46 exchanges heat between the air to be led into the vehicle cabin and the refrigerant, which makes the refrigerant to deprive heat of the air and then vaporizes it. As a result, the chilled air is fed into the vehicle cabin. On the other hand, the coolant cycles through the circulation path, independent of the cooling operation of fuel cell 10, from circulating pump 26, first interior heat exchanger 28, heat exchanger 14 with heating element, and three-way valve 24, to return to circulating pump 26.

During the cooling operation, the coolant is forced to flow through the coolant channel by the cooling device of the fuel cell, so that fuel cell 10 is continuously cooled regardless of whether fuel cell 10 operates continuously or intermittently. When fuel cell 10 is stopped, circulating pump 12 is also stopped together with other pumps for supplying the fuel gas (e.g., hydrogen) and the oxidizer gas (e.g., air). In this way, an overall energy consumption of the air conditioning control system can be reduced.

In step S14, the connection between the cooling device of fuel cell 10 and the air conditioning control device is controlled depending on the amount of heat removed from fuel cell 10. If a temperature sensor, such as a temperature sensor 20, determines the temperature of fuel cell 10 be equal to or more than a predetermined temperature TR, ECU 68 sends a control signal to three-way valve 24 to switch it so that tube B is connected to tube G and tube F is disconnected from tube G. As such, if it is determined that a significant amount of heat is drained from fuel cell 10, the circulation path of the coolant is thermally connected to the circulation path of the refrigerant of the air conditioning control device, depending on the operation state of fuel cell 10.

In contrast, if the temperature sensor 20 or the like measures a value for the temperature of fuel cell 10 that is less than the predetermined temperature TR, the ECU 68 sends another control signal to three-way valve 24 to switch it so that tube F is connected to tube G and tube B is disconnected from tube G. Thus, if it is determined that a small amount of heat is drained from fuel cell 10, the circulation path of the coolant is thermally disconnected from the circulation path of the refrigerant of the air conditioning control device.

In this embodiment, temperature sensor 20 detects the temperature of fuel cell 10 for the processing, but it is not limited thereto and a temperature sensor may be arranged in fuel cell 10 to directly measure the temperature thereof.

In step S16, it is determined whether fuel cell 10 is in a continuous operation state or in an intermittent operation state. The ECU 68 controls the operation state of fuel cell 10 according to the necessary output required for fuel cell 10. For example, fuel cell 10 may operate continuously when it is determined that the required output for fuel cell 10 is equal to or more than 10% of the rated output of the fuel cell. On the other hand, when the required output is less than 10% of the rated output of fuel cell 10, it is operated intermittently. If fuel cell 10 is in the continuous operation state, the process goes to step S18. If fuel cell 10 is in the intermittent operation state, the process goes to step S20.

In step S18, the heating operation is carried out while fuel cell 10 is operated continuously. The ECU 68 of control element 66 closes cooling solenoid valve for 36 and opens heating solenoid valve 50. The ECU 68 also deactivates cooling expansion valve 44 and activates heating expansion valve 38. As a result, the refrigerant is directed by the heating expansion valve 38 from motorized compressor 34 towards the exterior heat exchanger 40 via the heat exchanger 14 with a heating element. Further, the refrigerant from exterior heat exchanger 40 is guided to accumulator 48 through heating solenoid valve 50 without passing through second interior heat exchanger 46.

In this state, the motorized compressor 34 compresses the refrigerant and sends it out to tube a. The refrigerant then cycles through heat exchanger 14, heating expansion valve 38, exterior heat exchanger 40, heating solenoid valve 50, accumulator 48, and interior heat exchanger 42, and returns to motorized compressor 34.

The ECU 68 also opens the air mixing door in channel 30, so that the air flowing through channel 30 is guided into the vehicle cabin by passing through first interior heat exchanger 28.

When the temperature of fuel cell 10 is below the predetermined temperature TR, the coolant circulating path of fuel cell 10 is thermally disconnected by three-way valve 24 from the coolant circulating path of first interior heat exchanger 28. The coolant running out from the outlet of fuel cell 10 is cooled by radiator 16 and returned to fuel cell 10 by circulation pump 12.

When the temperature of fuel cell 10 is equal to or more than the predetermined temperature TR, a portion of the coolant runs out from the outlet of fuel cell 10, and cycles through three-way valve 24, circulation pump 26, first interior heat exchanger 28, and heat exchanger 14, and then returns to fuel cell 10 by circulation pump 12. During this time, the heat drained from fuel cell 10 is transferred via first interior heat exchanger 28 to the air sent into the vehicle cabin by fan 32. In heat exchanger 14, the heat is transferred from the coolant to the refrigerant circulating through the air conditioning control device.

During this time, the fuel cell 10 is operated continuously, and the fuel gas supplying pump (not shown) for supplying the fuel gas to fuel cell 10 and the oxidizer gas supplying pump (not shown) are therefore also operated continuously.

In step S20, the heating operation is carried out while fuel cell 10 is operated intermittently. The heating operation of the air conditioning control device is substantially similar to that in step S18.

When the temperature of fuel cell 10 is below the temperature TR, the coolant circulating path of fuel cell 10 is thermally disconnected from the coolant circulating path of first interior heat exchanger 28 by three-way valve 24. The coolant running out from the outlet of fuel cell 10 is cooled by radiator 16 and returned to fuel cell 10 by circulation pump 12. On the other hand, the coolant traveling through first interior heat exchanger 28 cycles from first interior heat exchanger 28, heat exchanger 14, and three-way valve 24 to return to circulation pump 26.

When the temperature of fuel cell 10 is greater than or equal to temperature TR, a portion of the coolant passes from the outlet of the fuel cell 10, and cycles through three-way valve 24, circulation pump 26, first interior heat exchanger 28, and heat exchanger 14, and then returns to fuel cell 10 via circulation pump 12. At this time, the heat drained from fuel cell 10 is transferred via first interior heat exchanger 28 to the air fed into the vehicle cabin by fan 32, whereby the vehicle cabin is heated. In heat exchanger 14, the heat is transferred from the coolant to the refrigerant circulating through the air conditioning control device.

During this time, the feed of at least one of the fuel gas and the oxidizer gas fed to fuel cell 10 is stopped intermittently in response to the intermittent stopping of fuel cell 10. Specifically, at least one of the fuel gas supplying pump (not shown) for supplying the fuel gas to fuel cell 10, and the oxidizer gas supplying pump (not shown) is operated intermittently.

At the same time, circulation pump 12 is forced to operate continuously, irrespective of any intermittent stopping of the fuel cell 10. Because circulation pump 12 is operated continuously, it is able to supply the coolant to first interior heat exchanger 28 by circulation pump 12 even if fuel cell 10 is stopped. As a result, the load of circulation pump can be minimized. Although circulation pump 12 has conventionally been stopped simultaneously with the stop of fuel cell 10, circulation pump 12 of this invention is operated even during the stop of fuel cell 10. Therefore, the coolant can be circulated by circulation pump 12, in addition to circulation pump 26 that has been conventionally acting as the only pump responsible for the circulation of the coolant during the stopping of the fuel cell 10. It is, therefore, sufficient for circulation pump 26 to have only a low rated output. Specifically, the maximum flow rate of circulation pump 26 may be set to less than one tenth of that of circulation pump 12. Preferably, the maximum output flow rate of the main circulation pump (i.e., circulation pump 12) may be set to more than double the output rating of the sub-circulation pump (i.e., circulation pump 26). Also, the output rating of circulation pump 26 may be set to less than one half of that of circulation pump 12. Preferably, the output rating of the main circulation pump (i.e., circulation pump 12) may be set to more than double the output rating of the sub-circulation pump (i.e., circulation pump 26).

Therefore, by reducing the output rating of circulation pump 26, it is possible to reduce the overall power consumption of the system during the operation of circulation pump 26, when fuel cell 10 is completely stopped and the cooling device is thermally disconnected from the air conditioning control system of fuel cell 10.

On the other hand, when the fuel cell 10 is operated intermittently and the heat output from the fuel cell 10 is utilized in the air conditioning control device of fuel cell 10, it is possible to circulate sufficient coolant to the first interior heat exchanger 28 to allow heat exchange between the coolant of the cooling device of fuel cell 10 and the refrigerant of the air conditioning control device even if the output rating of circulation pump 26 is reduced. In other words, rising of the temperature of the air compressor in the air conditioning control device can be prevented without placing a large coolant circulation pump on the air conditioning control device side during the intermittent operation of fuel cell 10. The load of motorized compressor 34 of the air conditioning control device may be reduced in this embodiment.

As described above, the exchange of heat between the coolant circulation system of the cooling device of fuel cell 10 and the refrigerant circulation system of the air conditioning control device is made possible, with the result that it is possible to use the heat removed from the fuel cell 10 for heating the vehicle cabin.

What is claimed is:

1. An air conditioning control system, comprising:
   a cooling device for cooling a fuel cell by circulating a coolant through the fuel cell by a main circulation pump;
   an air conditioning control device for controlling air conditioning in a vehicle interior, wherein heat exchange between the cooling device and the air conditioning control device is possible;
   a heat exchanger for exchanging heat between the cooling device and the air conditioning control device;
   a three-way valve configured to switch between a state for circulating the cooling fluid from the cooling device to the heat exchanger and a state for circulating the cooling fluid to the heat exchanger independent of the cooling device based on the air conditioning state of the vehicle interior;
   a sub-circulation pump for circulating the cooling fluid to the heat exchanger independent of the cooling device, and
   an electronic control unit programmed to control at least said three-way valve and the main circulation pump in response to the air conditioning state of the vehicle interior,
   wherein a first inlet of the three-way valve is in direct connection via a tube to a cooling liquid outlet of the fuel cell and an outlet of the three-way valve is in direct connection via a tube to an inlet of the sub-circulation pump,
   wherein the electronic control unit is programmed to switch the three-way valve to the state for circulating the cooling fluid to the heat exchanger independent of the cooling device when the air conditioning state of the vehicle interior is cooling and the state for circulating the cooling fluid from the cooling device to the heat exchanger when the air conditioning state of the vehicle interior is heating, and
   wherein, during intermittent operation of the fuel cell, the electronic control unit is programmed to stop an operation of the main circulation pump while the supply of at least one of a fuel gas and an oxidizer gas to the fuel cell is stopped when the electronic control unit controls the three-way valve to the state for circulating the cooling fluid to the heat exchanger independent of the cooling device, and continue the operation of the main circulation pump regardless of the stopping of the supply of at least one of the fuel gas and the oxidizer gas to the fuel cell when the electronic control unit controls the three-way valve to the state for circulating the cooling fluid from the cooling device to the heat exchanger.

2. An air conditioning control system according to claim 1, wherein a rated output of the main circulation pump is greater than or equal to twice that of the sub-circulation pump.

3. An air conditioning control system according to claim 1, wherein a rated output of the main circulation pump is greater than or equal to ten times that of the sub-circulation pump.

* * * * *